US005460420A

United States Patent [19]
Perkins et al.

[11] Patent Number: 5,460,420
[45] Date of Patent: Oct. 24, 1995

[54] COMPARTMENTIZED PLASTIC BUMPER

[75] Inventors: Jimmie G. Perkins, Monroe, Tenn.; George Daniels, Stratham, N.H.

[73] Assignee: McCord Winn Textron, Winchester, Mass.

[21] Appl. No.: 336,824

[22] Filed: Nov. 9, 1994

[51] Int. Cl.$^6$ ................................................. B60R 19/48
[52] U.S. Cl. ........................................ 293/106; 293/117
[58] Field of Search ............................. 293/1, 5, 106, 293/110, 117; 180/314; 296/37.1

[56] References Cited

U.S. PATENT DOCUMENTS

| | | |
|---|---|---|
| 1,486,222 | 3/1924 | Berry . |
| 1,709,494 | 4/1929 | Shoemaker .............................. 293/110 |
| 1,719,055 | 7/1929 | Herzer . |
| 1,745,705 | 2/1930 | Nordquist . |
| 1,784,387 | 12/1930 | Postel . |
| 1,970,724 | 8/1934 | Arnold ........................................ 280/5 |
| 1,995,088 | 3/1935 | Bellamy ..................................... 293/55 |
| 2,181,772 | 11/1939 | Snyder ....................................... 220/20 |
| 2,866,510 | 12/1958 | Flamm ....................................... 180/53 |
| 2,993,721 | 7/1961 | Bowman ..................................... 293/69 |
| 3,471,070 | 10/1969 | Olson .................................... 224/42.04 |
| 3,512,795 | 5/1970 | Naeve ......................................... 280/5 |
| 3,614,136 | 10/1971 | Dent ......................................... 280/500 |
| 3,689,054 | 9/1972 | Gouirand ............................. 293/117 X |
| 3,690,710 | 9/1972 | Curran ...................................... 293/110 |
| 3,708,194 | 1/1973 | Amit ................................... 293/117 X |
| 4,487,446 | 12/1984 | Reich, II ................................... 296/106 |
| 4,525,005 | 6/1985 | Prochaska et al. ....................... 293/117 |
| 4,567,955 | 2/1986 | Baravalle ................................ 180/68.1 |
| 4,653,788 | 3/1987 | Giusto ...................................... 293/117 |
| 4,674,782 | 6/1987 | Helber ...................................... 293/106 |
| 4,746,263 | 5/1988 | Cook ......................................... 414/543 |
| 4,902,059 | 2/1990 | Tritton ...................................... 293/117 |
| 5,141,068 | 8/1992 | Mendicino ............................. 180/68.3 |

FOREIGN PATENT DOCUMENTS

| | | | |
|---|---|---|---|
| 3441513 | 5/1986 | Germany ............................... 180/314 |
| 1386545 | 3/1975 | United Kingdom ................... 293/110 |

OTHER PUBLICATIONS

*Plastics Engineering*, Dec. 1992, pp. 21–24, "Blow Molded Vehicle Bumper Beams".

*Primary Examiner*—Dean Kramer
*Attorney, Agent, or Firm*—Reising, Ethington, Barnard & Perry

[57] ABSTRACT

There is disclosed herein a molded plastic front bumper beam for a vehicle. The bumper beam includes upper and lower separate hollow compartments for carrying selected fluids. The upper and lower compartments are interconnected by an integral front wall segment. Dual openings are formed in the rear portion of each compartment adapted to accommodate receiving and dispensing fluids, such as radiator coolant, windshield washer fluid, rear window washer fluid, and/or head lamp washer fluid.

3 Claims, 2 Drawing Sheets

COMPARTMENTIZED PLASTIC BUMPER

TECHNICAL FIELD

This invention relates generally to vehicle bumpers and, more particularly, to plastic molded bumper beams formed to have hollow sections therein for storing various fluids.

BACKGROUND ART

Bumper arrangements having hollow spaces therein are known. For example, Berry U.S. Pat. No. 1,486,222 discloses a tubular bumper adapted to carry an emergency supply of fuel.

Postel U.S. Pat. No. 1,784,387 discloses a rubber bumper tube containing brake fluid and adapted to communicate same to actuate the brake drums in the event of an impact shock against the bumper tube.

Flamm U.S. Pat. No. 2,866,510 discloses a dual casting bumper arrangement for a tractor, with one casting containing a supply of hydraulic fluid, with a suction line leading therefrom to a pump assembly mounted in the second casting.

Bowman U.S. Pat. No. 2,993,721 discloses a rear bumper for a light truck formed of plates welded together to form outer box-like walls and inner walls separating aligned segments. Openings are formed through the inner walls, and a capped filler opening is mounted in an upper wall and a drain plug in a lower wall for containing water as ballast when the truck is empty.

Reich II U.S. Pat. No. 4,487,446 discloses a bumper having a hollow chamber in which compressed air is stored for inflating the tires of off-road vehicles.

Prochaska et al U.S. Pat. No. 4,525,005 discloses a bumper including two box shaped bars made of fiber-reinforced material and either bonded together or connected by an intermediate steel securing plate.

Baravalle U.S. Pat. No. 4,567,955 discloses a front bumper formed of a molded plastics material and having a front section of an air conveyor formed integrally therewith and secured to a fixed section intermediate the front section and the radiator, such that, in the event of a minor frontal collision, once the bumper returns to its initial position, the intermediate section is also returned to restore the effectiveness of the radiator.

DiGiusto U.S. Pat. No. 4,653,788 discloses a hollow front bumper having a front inlet aperture acting as an air intake, and two rear apertures defined by nozzles arranged to direct respective air flows toward the front wheel brakes, along with a rear tubular appendage acting as a duct for conveying an air flow toward the radiator.

Tritton U.S. Pat. No. 4,902,059 discloses upper and lower steel tubular bumper members, interconnected at their respective end portions by fluid passage spacers, such that engine coolant flows into and through one tubular member and through and out of the other.

*Plastics Engineering*, December 1992, pages 21–24, in an article entitled "Blow Molded Vehicle Bumper Beams," describes producing bumper box beams in one step.

DISCLOSURE OF THE INVENTION

A general object of the invention is to provide an improved bumper beam which is molded to include liquid storage sections therein.

Another object of the invention is to provide a molded hollow bumper beam which is adapted to having fluids such as radiator coolant, and windshield and rear window washer fluid selectively received therein and dispensed therefrom.

A further object of the invention is to provide a one-piece molded bumper beam having two hollow sections formed thereacross and suitable fill and outlet openings formed in each hollow section.

A still further object of the invention is to provide a one-piece molded bumper beam having upper and lower fluid storage compartments formed there in and interconnected by an integral front wall.

Still another object of the invention is to provide a one-piece molded bumper beam having upper and lower fluid storage compartments formed therein and having recesses formed in the respective compartments suitable for having pumps mounted therein and in communication with the fluid via a formed outlet opening.

These and other objects and advantages will become more apparent when reference is made to the following drawings and the accompanying description.

BEST MODE OF CARRYING OUT THE INVENTION

Figure 1:
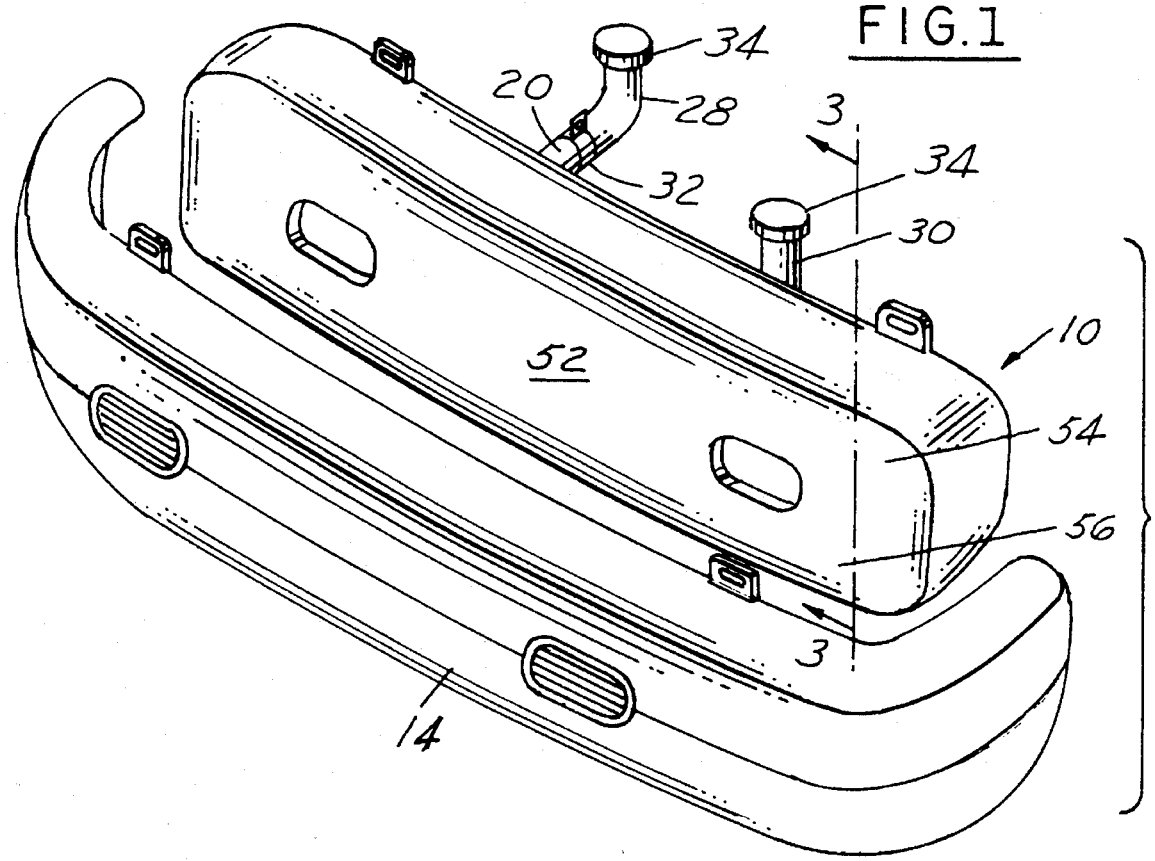
FIG. 1 is a perspective view of the invention, and a typical bumper fascia for covering same.
Figure 2:
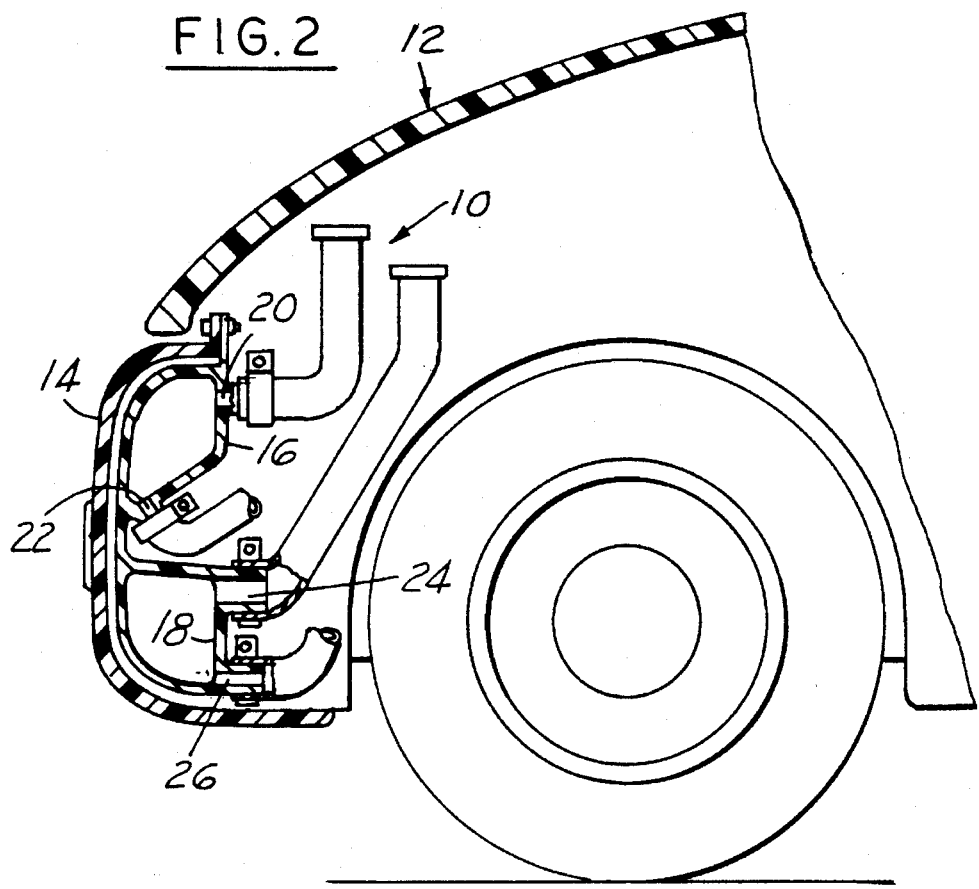
FIG. 2 is an enlarged cross-sectional side view of a front portion of a vehicle embodying the invention.

Referring now to the drawings in greater detail, FIG. 1 illustrates a front molded plastic bumper beam 10 for a vehicle, represented as 12 (FIG. 2). The bumper beam 10 may be formed by blow molding, in one piece. A plastic fascia 14, painted to match the vehicle 12 paint, covers the outer surface of the bumper beam 10. Separate upper and lower compartments 16 and 18, respectively, are formed in the bumper beam 10, extending throughout the width and depth thereof. Flanged openings 20 and 22 and flanged openings 24 and 26 are formed in upper and lower portions of the respective compartments 16 and 18.

Arcuate-shaped fill tubes 28 and 30 are each secured at one end thereof by any suitable means, such as clamps 32, to the respective inlet openings 20 and 24. Caps 34 are secured in any suitable manner to the free ends of the fill tubes 28 and 30. Hoses 36 and 38 are secured to the flanged outlet openings 22 and 26. At least one of the compartments, say, compartment 16, may serve as a radiator coolant overflow reservoir, with coolant from the radiator (not shown) flowing through the hose 36 to the compartment.

It may be desirable to utilize the compartments 16 and/or 18 to store front or rear windshield washer fluid. As shown in FIG. 4, for this application, the compartments may be formed to include a recessed portion 38 suitable for the mounting therein of a pump 40. A flanged inlet 42 on the pump 40 is inserted into an opening 44 formed in the compartment 16 or 18, in lieu of the lower flanged openings 22 and 26 shown in FIG. 3. A suitable seal, represented as 46, serves to seal the opening 44 around the flanged inlet 42.

A pump outlet 48 is adaptable to having a hose, represented as 50 secured thereto for supplying washer fluid to the windshield or rear window. The fill tubes 28 and 30 may be the same as for the FIG. 3 embodiment.

For each of the embodiments, a front wall segment 52 is integrally molded to interconnect the upper and lower compartments 16 and 18. The front wall segment 52 is flush with the front wall portions 54 and 56 of the respective upper and lower compartment 16 and 18 to serve as the front bumper continuous surface.

Industrial Applicability

It should be apparent that the invention provides an improved molded bumper beam having dual fluid storage compartments formed therein.

Figure 3:
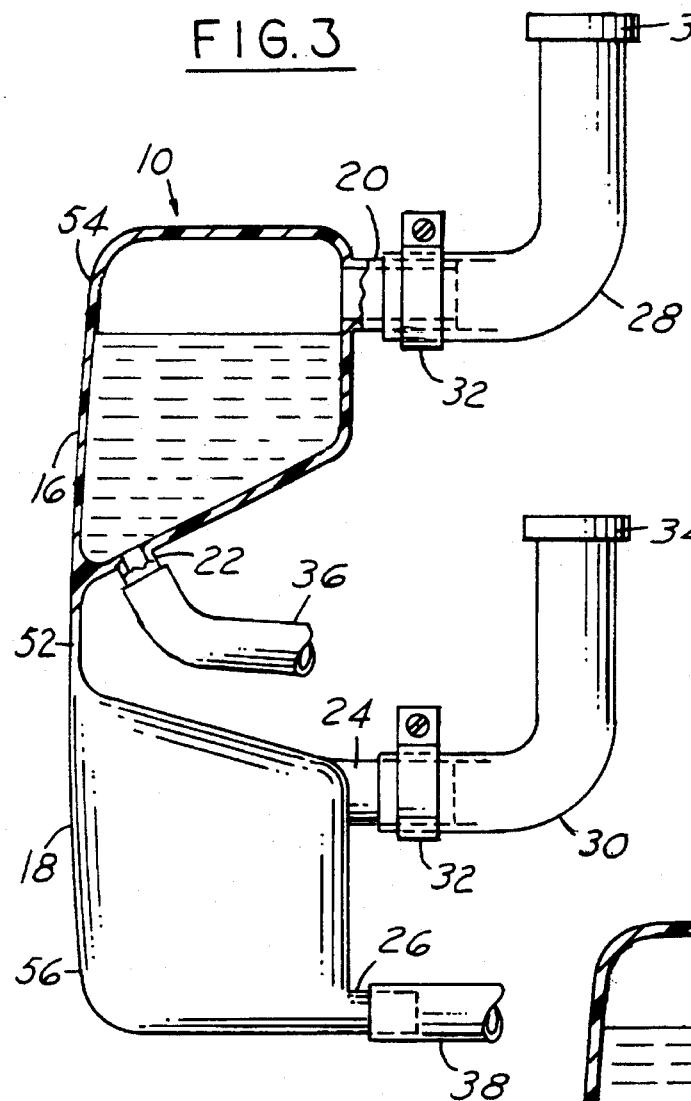
FIG. 3 is an enlarged side elevational view in partial cross-section of the inventive portion of FIG. 2, the view being taken substantially along the plane of the line 3—3 of FIG. 1, and looking in the direction of the arrows.
Figure 4:
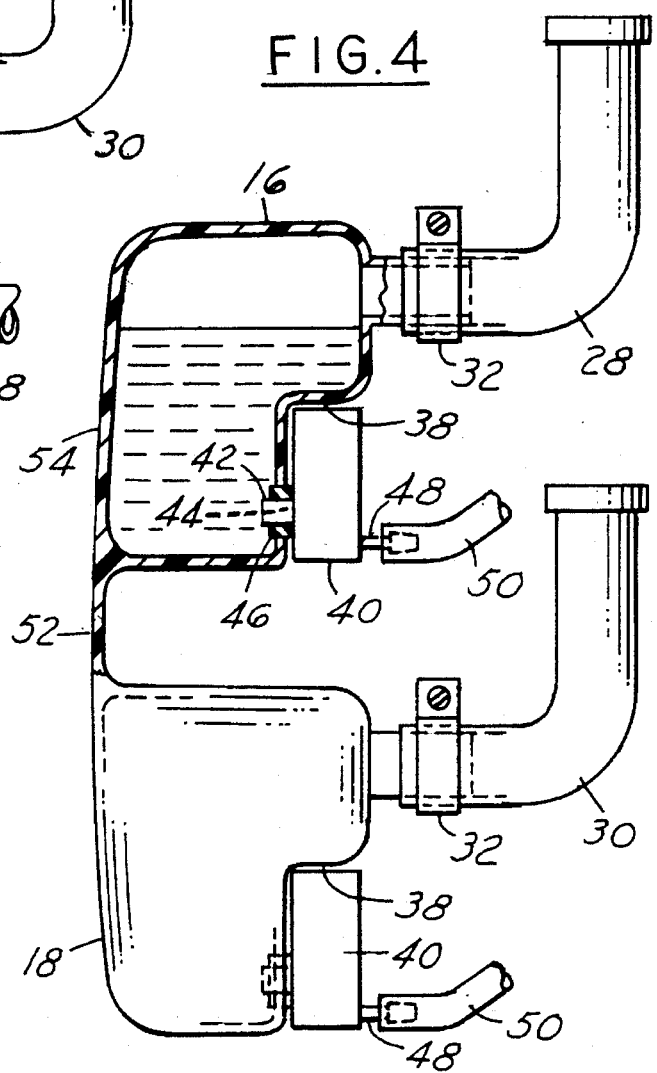
FIG. 4 is a view similar to FIG. 3 illustrating an alternate embodiment of the invention.

It should be further apparent that the FIGS. 3 and 4 dual compartment embodiments may be formed to include one hollow portion from FIG. 3 and the other hollow portion from FIG. 4 to accommodate two different fluid media applications.

It should be still further apparent that the inventive bumper beam may be molded to accommodate complex frontal shapes while providing dual box shapes for strength.

While but two embodiments of the invention have been shown and described, other modifications are possible within the scope of the following claims.

What is claimed is:

1. A one-piece molded front bumper beam for a vehicle, the bumper beam comprising upper and lower separate hollow compartments suitable for storing fluid therein, and interconnected by a flush integral front wall section, and dual openings formed in each hollow compartment, wherein a recess is molded in at least one of said hollow compartments adapted to having a pump mounted therein for fluid communication with one of the dual openings therein.

2. The one-piece molded front bumper beam described in claim 1, and a fluid fill tube and a hose operatively connected to the respective dual openings of each hollow compartment.

3. The one-piece molded front bumper beam described in claim 2, wherein the selected fluid for each hollow compartment may be any of the group including radiator coolant, windshield washer fluid, rear window washer fluid, and head lamp washer fluid.

* * * * *